US012775132B2

(12) United States Patent
Ockenfuss

(10) Patent No.: US 12,775,132 B2
(45) Date of Patent: Oct. 27, 2026

(54) ANGLE SELECTIVE FILTER

(71) Applicant: VIAVI Solutions Inc., Chandler, AZ (US)

(72) Inventor: Georg J. Ockenfuss, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 335 days.

(21) Appl. No.: 18/503,843

(22) Filed: Nov. 7, 2023

(65) Prior Publication Data

US 2025/0004185 A1 Jan. 2, 2025

Related U.S. Application Data

(60) Provisional application No. 63/510,458, filed on Jun. 27, 2023.

(51) Int. Cl.
*G02B 5/28* (2006.01)

(52) U.S. Cl.
CPC ............... *G02B 5/288* (2013.01); *G02B 5/28* (2013.01); *G02B 5/286* (2013.01)

(58) Field of Classification Search
None
See application file for complete search history.

(56) References Cited

U.S. PATENT DOCUMENTS

| | | | | |
|---|---|---|---|---|
| 9,354,369 | B2 | 5/2016 | Hendrix et al. | |
| 2005/0078375 | A1 * | 4/2005 | Hall | G02B 5/285 359/581 |
| 2019/0219748 | A1 | 7/2019 | Bradley, Jr. et al. | |
| 2020/0408977 | A1 | 12/2020 | Eisenhammer | |
| 2021/0302635 | A1 | 9/2021 | Ockenfuss | |

OTHER PUBLICATIONS

Extended European Search Report for European Application No. EP24165140 dated Sep. 9, 2024, 10 pages.

* cited by examiner

*Primary Examiner* — Richard H Kim
(74) *Attorney, Agent, or Firm* — Harrity & Harrity, LLP

(57) ABSTRACT

In some implementations, an optical filter assembly includes a first optical filter disposed on a first side of a substrate, wherein the first optical filter is a bandpass filter; and a second optical filter disposed on a second side of the substrate, wherein the second optical filter is associated with a threshold amount of angle shift at a threshold angle of incidence.

20 Claims, 11 Drawing Sheets

300

302

304

306

308

310

312

314

ANGLE SELECTIVE FILTER

CROSS-REFERENCE TO RELATED APPLICATION

This Patent Application claims priority to U.S. Provisional Patent Application No. 63/510,458, filed on Jun. 27, 2023, and entitled "WAVELENGTH AND ANGLE SENSITIVE BANDPASS FILTER." The disclosure of the prior Application is considered part of and is incorporated by reference into this Patent Application.

BACKGROUND

An optical filter is used to select a spectral band or a spectral component of incoming light. A high pass filter, for example, selects light at wavelengths longer than an edge wavelength of the filter. Conversely, a low pass filter selects light at wavelengths shorter than an edge wavelength. A bandpass filter is a distinct type of filter, which selects light at wavelengths proximate to a center wavelength of the filter within a bandwidth of the filter. A tunable bandpass filter is an optical filter, the center wavelength of which may be adjusted or tuned.

Filter performance of an optical filter may be degraded when an angle of incidence (AOI) of light directed toward the optical filter changes from a configured incidence (e.g., 0 degrees, 45 degrees, 90 degrees, etc.) to a threshold angle of incidence (e.g., greater than approximately 30 degrees deviation from the configured incidence). In this case, band edges may experience blue shift to shorter wavelengths. Moreover, polarization effects may become significant for the optical filter when the angle of incidence changes from a configured incidence (e.g., a normal incidence, a non-normal selected incidence, etc.) to a threshold angle of incidence (e.g., greater than a threshold level of effect).

SUMMARY

In some implementations, an optical filter assembly includes a first optical filter disposed on a first side of a substrate, wherein the first optical filter is a bandpass filter; and a second optical filter disposed on a second side of the substrate, wherein the second optical filter is associated with a threshold amount of angle shift at a threshold angle of incidence.

In some implementations, an optical filter includes a bandpass filter with at least a first threshold level of transmissivity at a configured center wavelength, wherein a first side of the bandpass filter is configured to receive a beam; and an angle shift filter with at least a second threshold level of angle shift at the configured center wavelength and at angles of incidence greater than a configured value, wherein the angle shift filter is disposed on a second side of the bandpass filter.

In some implementations, an optical system includes an electro-optic component; a bandpass filter with at least a first threshold level of transmissivity at a configured center wavelength, wherein a first side of the bandpass filter is configured to receive a beam; and an angle shift filter with at least a second threshold level of angle shift at the configured center wavelength and at angles of incidence greater than a configured value, wherein the angle shift filter is disposed on a second side of the bandpass filter, and wherein the bandpass filter and the angle shift filter are aligned to the electro-optic component.

DETAILED DESCRIPTION

Figure 1:
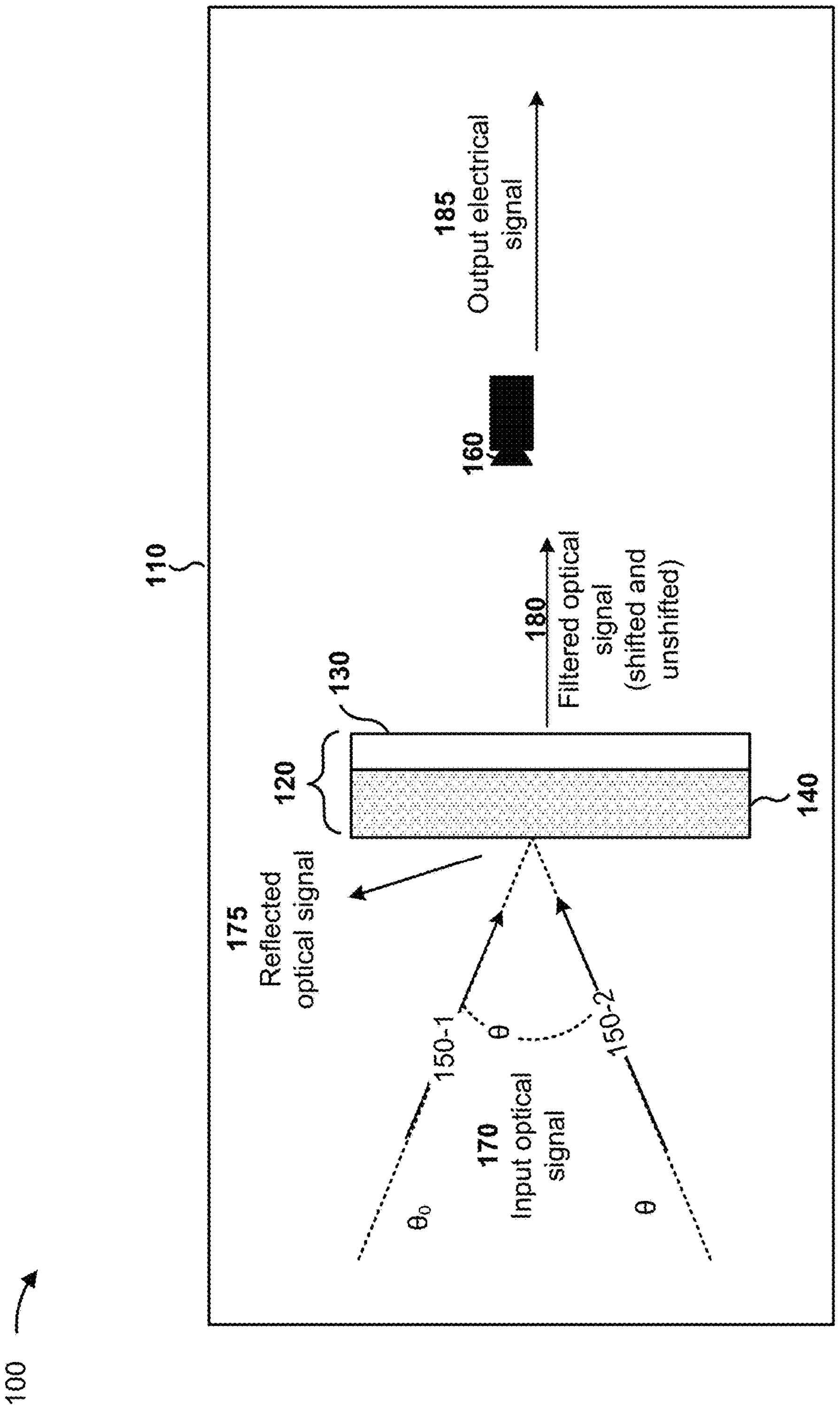
FIG. 1 is a diagram of an example implementation described herein.

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

An optical sensor device may include a sensor element array of sensor elements to receive light initiating from an optical source, such as an optical transmitter, a light bulb, an ambient light source, and/or the like. For example, in a spectrometer, the optical sensor device may include an array of sensor elements to receive light reflected off a target object, thereby enabling an identification of the target object. A sensor element may be associated with an optical filter that filters light to the sensor element to enable the sensor element to obtain information regarding a particular spectral range of electromagnetic frequencies. For example, the sensor element may be aligned with an optical filter with a passband in a near-infrared (NIR) spectral range, a visible spectral range, an ultraviolet spectral range, and/or the like.

A total integrated throughput of a bandpass filter may be relatively insensitive to angle shift (e.g., a change to a configured angle of incidence (AOI) of light directed toward an optical filter). For example, even at relatively large angles of incidence (e.g., greater than a threshold of, for example, 30 degrees from a configured angle of incidence), bandpass filters may allow a relatively large proportion of light through the filter. However, light that passes through the bandpass filter with a relatively large angle of incidence may include stray light, which increases a noise level detected by a sensor element, such as a photo diode. Additionally, when there are multiple sources of light present, allowing light with relatively large angles of incidence through a bandpass filter may result in cross-talk between the multiple sources of light. In other words, both stray light from unintended sources (e.g., the sun or a light bulb in a room) may pass through a bandpass filter as well as light that is from an intended source (e.g., an optical emitter) but is intended to be directed toward a different sensor element. Further when multiple devices or channels are using the same light source wavelength as a wavelength of interest for a particular detector, the presence of the multiple devices or channels may result in stray light being directed toward the particular detector at particular angles of incidence (e.g., angles greater than a threshold value). Accordingly, it may be desirable to limit light that passes through a bandpass filter to a configured angle range to avoid excess noise and/or cross-talk between optical sources.

Some implementations described herein provide an optical filter assembly, optical device, optical element, optical module, optical system, and/or the like with two optical filters deposited on a common substrate surface location to restrict an angle of incidence of light and provide bandpass interference filtering. For example, a composite optical filter may include a first optical filter that is a bandpass optical filter and a second optical filter that is a high angle shift (e.g., greater than or equal to the threshold angle shift) optical filter. The first optical filter and the second optical filter may be realized on opposite sides of a substrate or on a single side of a substrate (e.g., by using two distinct optical filters or a single optical filter that combines functionalities of the first optical filter and the second optical filter). In this way, the optical filter assembly may transmit light at a configured angle of incidence and reflect or block light at greater than a threshold angle of incidence, as well as reflect or block light outside of a configured passband. In this way, effects of greater than a threshold angle of incidence may be avoided for bandpass filters, such as by avoiding excess noise or cross-talk in an optical sensor or sensor element array.

FIG. 1 is a diagram of an example implementation 100 described herein. As shown in FIG. 1, example implementation 100 includes an optical system 110. Optical system 110 may be a portion of an optical system and may provide an electrical output corresponding to a sensor determination. For example, optical system 110 may be a portion of a LIDAR system, a three-dimensional sensing system, a spectroscopic system, a gesture recognition system, a facial recognition system, an object recognition system, an imaging system, an iris recognition system, a motion tracking system, or a communications system, among other examples.

In some implementations, the optical system 110 may include an optical filter assembly 120, which may include a substrate 130 and a set of optical filters 140. In some implementations, the optical filter assembly 120 may include a bandpass filter. For example, the optical filter assembly 120 may include one or more layers forming a bandpass interference filter that is configured to pass through a first portion of light at a first range of wavelengths and block a second portion of light at a second range of wavelengths, as described in more detail herein. Additionally, or alternatively, the optical filter assembly 120 may include a long wavelength passband (LWP) filter, a short wavelength passband (SWP) filter, a low angle-shift (LAS) bandpass filter, a hyper-low angle shift (HLAS) bandpass filter, a broad wavelength passband (BWP) filter, an infrared cut-off (IR Cut) filter, a notch filter, and/or the like. In some implementations, the optical filter assembly 120 may have a bandpass of between 200 nanometers (nm) and 14000 nm and may be used in a visible spectral range, an NIR spectral range, a midwave infrared (MWIR) spectral range, an longwave infrared (LWIR) spectral range, an ultraviolet spectral range, and/or the like.

In some implementations, the optical filter assembly 120 may include an angle-shift filter. For example, the optical filter assembly 120 may include one or more layers forming an angle-sensitive filter that is configured to pass through a first portion of light at a first range of angles of incidence (e.g., without a shift to a wavelength of the first portion of light) and to shift a wavelength of a second portion of light at a second range of angles of incidence. In this case, by shifting the wavelength of the second portion of light, the optical filter assembly 120 may ensure that stray light, which enters a cavity of the optical system 110, is not at a wavelength of interest for the optical system 110. In other words, when the optical system 110 is configured to measure a characteristic of light at a wavelength of, for example, 980 nm, the angle-sensitive filter ensures that light with a normal angle of incidence (e.g., a 0 degree angle of incidence, ±10 degrees) is not shifted, but light with a threshold angle of incidence (e.g., greater than 10 degrees or less than −10 degrees) is shifted to a different wavelength (e.g., to a center wavelength of 900 nm or 1100 nm). Accordingly, by shifting a wavelength of the second portion of light, the first portion of light can be measured without (or with a reduced amount of) noise or cross-talk from the second portion of light.

In some implementations, the optical filter assembly 120 may include one or more other filters. For example, the optical filter assembly 120 may include an anti-reflectance filter. For example, the optical filter assembly 120 may include an anti-reflectance filter that is configured for the same bandpass region as a bandpass filter of the optical filter assembly 120. In this case, the anti-reflectance filter may be coated on a surface or included within the bandpass filter.

Although some implementations described herein may be described in terms of one or more optical filters in a sensor system, some (other) implementations may be used in another type of system, in an optical element external to a sensor system, in an optical element of an optical package, and/or the like. In some implementations, the optical system 110 may include a photo detector system, an avalanche photo detector system, a single-photon avalanche diode (SPAD) detector system, or a complementary metal oxide semiconductor (CMOS) detector system.

In some implementations, substrate 130 may be a transparent substrate, such as a glass substrate, a silicon substrate, a germanium substrate, and/or the like. In some implementations, substrate 130 may be a silicon dioxide substrate. In some implementations, the substrate 130 may be disposed on a particular side of the set of optical filters 140. For example, the substrate 130 may have a first optical filter 140 (e.g., an angle-sensitive filter) disposed on a surface of the substrate 130, and a second optical filter 140 may be disposed on top of the first optical filter 140 (e.g., such that the first optical filter 140 is sandwiched by the second optical filter 140 and the substrate 130). In other words, both the first optical filter 140 and the second optical filter 140 (in either order) may be disposed on the same side of a substrate 130 (or an optical filter 140 may form the substrate for the other optical filter 140). Additionally, or alternatively, the substrate 130 may have optical filters 140 on opposing sides of the substrate 130. For example, a first optical filter 140 may be disposed on a first side of the substrate 130 and a second optical filter 140 may be disposed on a second side of the substrate 130 (e.g., such that the first optical filter 140 and the second optical filter 140 sandwich the substrate 130). In some implementations, substrate 130 may be omitted. For example, a bandpass filter (of the set of optical filters 140) may be disposed directly on a surface of an angle-sensitive filter (of the set of optical filters 140) without a substrate therebetween or onto which either filter is disposed. In this case, the bandpass filter and the angle-sensitive filter are matched to have coherence of light between the bandpass filter and the angle-sensitive filter. In some implementations, rather than a substrate separating filters of the set of optical filters 140, another medium may separate filters of the set of optical filters 140, such as an air gap, a gaseous gap, or a liquid gap, among other examples.

In some implementations, the set of optical filters 140 may include a set of alternating high refractive index layers and low refractive index layers (e.g., an alternating arrangement of multiple high refractive index layers and multiple low refractive index layers). For example, the set of optical filters 140 may include a high refractive index material, such as amorphous silicon or niobium titanium oxide, among other examples. Additionally, or alternatively, the set of optical filters 140 may include a silicon layer, a silicon dioxide layer, a hydrogenated silicon layer, a tantalum pentoxide layer, a niobium pentoxide layer, a germanium layer, a silicon germanium layer, a hydrogenated silicon germanium layer, a niobium tantalum oxide layer, a titanium dioxide layer, a silicon nitride layer, or an aluminum nitride layer, among other examples. Additionally, or alternatively, the set of optical filters 140 may include another type of high refractive index material layer with a refractive index of greater than 2.0, greater than 2.5, greater than 3.0, greater than 3.5, and/or the like.

In some implementations, the set of optical filters 140 may include a low refractive index material, such as silicon dioxide. Additionally, or alternatively, the set of optical filters 140 may include another type of low refractive index material layer with a refractive index of less than 2.5, less than 2.0, less than 1.5, and/or the like. For example, the set of optical filters 140 may include a set of alternating layers of amorphous silicon layers and silicon dioxide layers for a bandpass filter operating at 940 nm and a set of alternating layers of tantalum oxide layers and silicon oxide layers for an angle-sensitive filter. In some implementations, the set of optical filters 140 may include three or more different materials. For example, the set of optical filters 140 may have a subset of hydrogenated silicon layers, a subset of tantalum pentoxide layers, and a subset of silicon dioxide layers. In this case, using three or more different types of layers may enable filter layers 140 to achieve a higher transmissivity and/or a reduced angle shift at some wavelengths, relative to using only two different materials.

As further shown in FIG. 1, and as shown by reference number 170, an input optical signal is directed toward optical filter assembly 120 at one or more angles of incidence, θ. For example, input optical signals 150-1 and 150-2 may be directed toward optical filter assembly 120 at angles of incidence $\theta_0$ (e.g., a configured angle of incidence) and θ. As shown by reference number 175, a first portion of the input optical signal is reflected by optical filter assembly 120. For example, based on a portion of the input optical signal being outside of a passband of a bandpass filter of the set of optical filters 140, the set of optical filters 140 may reflect the portion of the input optical signal.

As further shown in FIG. 1, and by reference number 180, another portion of the optical signal is transmitted through optical filter assembly 120. For example, a portion of the input optical signal within the passband of optical filter assembly 120 is passed through optical filter assembly 120, as described in more detail herein. Some of the portion of the input optical signal within the passband of the optical filter assembly 120 may be angle-shifted and/or blocked. For example, light at angle of incidence $\theta_0$ that passes through the optical filter assembly 120 is unshifted and/or passed through by an angle-sensitive filter of the set of optical filters 140. In contrast, light at angles of incidence θ or greater is angle shifted and/or blocked by the angle-sensitive filter of the set of optical filters 140. Accordingly, the portion of the input optical signal passing through the optical filter assembly 120 includes a first sub-portion that is unshifted or unblocked and a second sub-portion that is shifted or blocked.

Although the terms "unshifted" or "unblocked" and "shifted" or "unblocked" are used, all filter spectra may be shifted or blocked by some amount (e.g., a configured percentage) and "unshifted" or "unblocked" light may include light for which a filter spectrum is shifted by less than or equal to a threshold amount or that has greater than or equal a threshold percentage of transmission, and "shifted" may include light for which a filter spectrum is shifted by greater than the threshold amount or that is transmitted by less than the threshold percentage.

As shown by reference number 185, based on a portion of the input optical signal being passed to an optical sensor 160 (e.g., an optical detector or photo detector), optical sensor 160 may provide an output electrical signal for optical system 110. For example, optical sensor 160 may provide an output electrical signal identifying an intensity of light, a characteristic of light (e.g., a spectroscopic signature), a wavelength of light, and/or the like. In some implementations, the optical sensor 160 may perform a measurement of only a sub-portion of light. For example, the optical sensor 160 may perform a measurement of the light that passes the filter at low angle and may not perform a measurement of the light that is reflected or blocked at the filter at high angles. Additionally, or alternatively, the optical sensor 160 may perform a measurement of the light and the light, but the optical sensor 160 may be configured such that an amount of noise or cross-talk in the measurement resulting from the shifted light is less than a threshold amount of noise or cross-talk.

As indicated above, FIG. 1 is provided merely as an example. Other examples may differ from what is described with regard to FIG. 1.

Figure 2A:
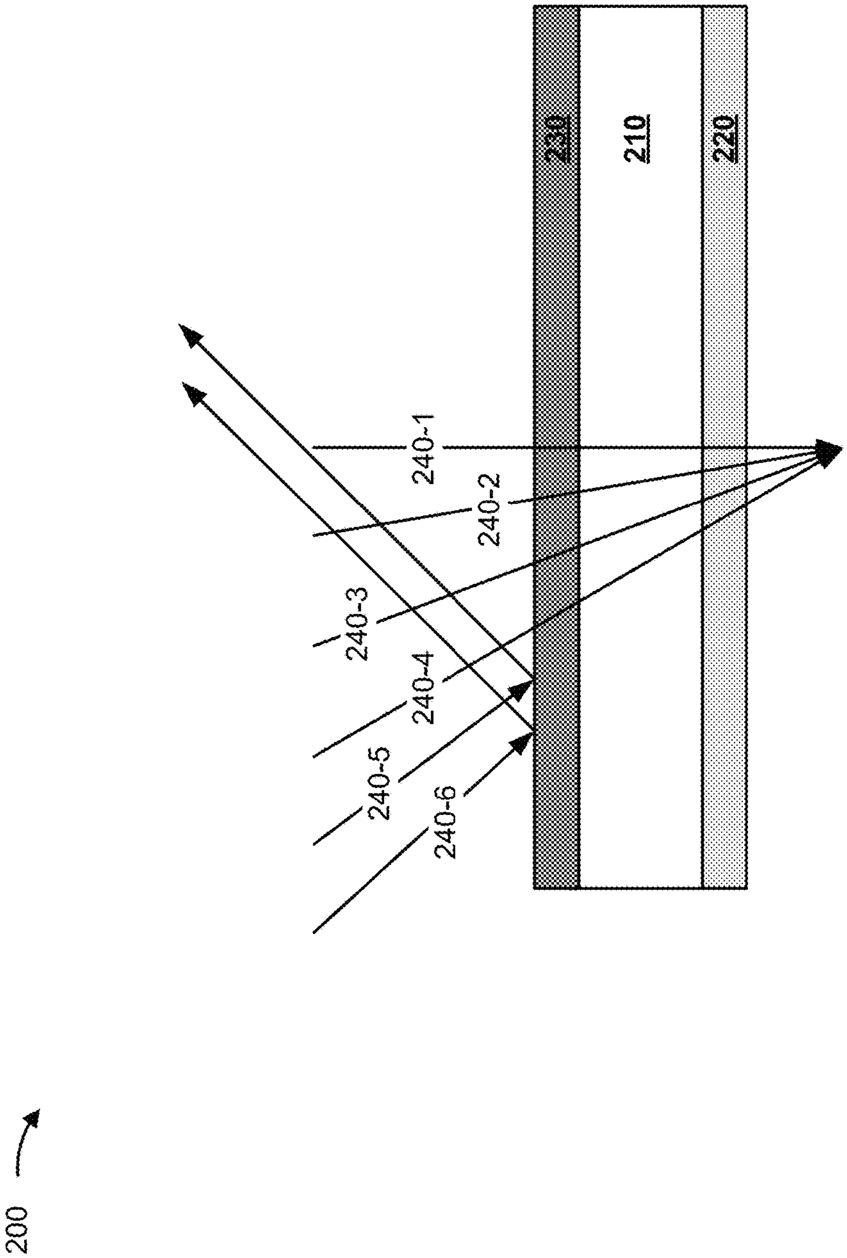
FIGS. 2A and 2B are diagrams of example optical filter assemblies.
Figure 2B:
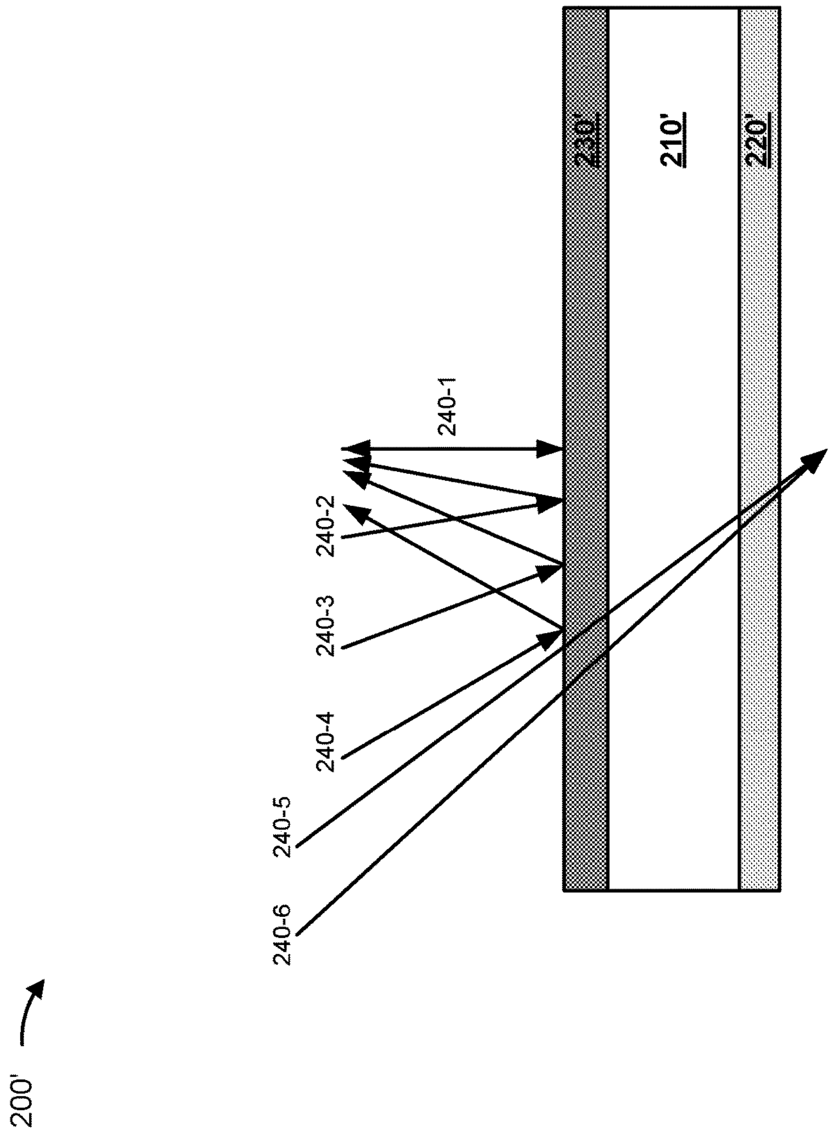

FIGS. 2A and 2B are diagrams of example optical filter assemblies 200/200'. As shown in FIG. 2A, optical filter assembly 200 includes a substrate 210, onto which is disposed a first optical filter 220 on a first side and a second optical filter 230 on a second side.

In some implementations, first optical filter 220 may be a passband filter that exhibits a low amount of angle shift. For example, first optical filter 220 may be a low angle shift passband filter manufactured using a silver (Ag) material. In some implementations, the silver material may form a photopic coating, a red-green-blue color filter, or another type of low angle shift filter. Additionally, or alternatively, first optical filter 220 may be a low angle shift bandpass filter manufactured using hydrogenated silicon (Si:H). In some implementations, first optical filter 220 may be associated with less than a threshold angle shift at greater than a threshold angle of incidence, as described in more detail here. For example, first optical filter 220 may be associated with less than 20% angle shift, less than 10% angle shift, less than 5% angle shift, less than 1% angle shift, and/or the like at a particular range of angles of incidence. In this case, the particular range of angles of incidence may be a range of approximately 0 degrees to approximately 60 degrees, approximately 0 degrees to approximately 45 degrees, approximately 0 degrees to approximately 30 degrees, and/or the like.

In some implementations, a low angle-shift (LAS) filter, such as the first optical filter, may include a bandpass filter that exhibits an angle shift of a center of a passband of, for example, less than approximately 20 nm at an angle range of approximately 0 degrees to approximately 30 degrees in, for example, a near-infrared (NIR) spectral range. In some implementations, the LAS filter, in the NIR spectral range, may include amorphous silicon or hydrogenated silicon as a high refractive index material. In some implementations, a hyper-low angle shift (HLAS) filter may include a bandpass filter than exhibits an angle shift of a center of a passband of, for example, less than approximately 10 nm at an angle range of approximately 0 degrees to approximately 30 degrees in, for example, an NIR spectral range. In some implementations, the HLAS filter, in the NIR spectral range, may include amorphous silicon or hydrogenated silicon as a high refractive index material. Although LAS and HLAS types of the first optical filter are described with regards to the NIR spectral range, it is understood that LAS filters and HLAS filters may be used for the first optical filter for other spectral ranges. In some implementations, first optical filter 220 may include multiple layers. For example, multiple layers may be deposited and/or patterned, such as by using a photolithography procedure, to form first optical filter 220. In some implementations, optical filter assembly 200 may be associated with a particular size. For example, optical filter may be associated with a thickness of between approximately 10 nm and 5000 nm.

In some implementations, second optical filter 230 may be an angle-sensitive filter exhibiting a high amount of angle shift. For example, second optical filter 230 may be associated with an angle shift of greater than 1%, greater than 5%, greater than 10%, greater than 20%, greater than 30%, and/or the like at a particular range of angles of incidence. In some implementations, an angle-sensitive filter or high angle shift filter, such as the second optical filter 230, may include a filter associated with an angle shift in a range of 10% to 20%. In some implementations, the particular range of angles of incidence for which a configured angle shift occurs may be between approximately 0 degrees and approximately 90 degrees, approximately 10 degrees and approximately 60 degrees, approximately 30 degrees and approximately 45 degrees, and/or the like. In some implementations, the particular range of angles of incidence may be greater than approximately 30 degrees, greater than approximately 45 degrees, and/or the like. In some implementations, second optical filter 230 may be manufactured from a material with less than a threshold refractive index. For example, second optical filter 230 may be a silicon dioxide ($SiO_2$) based filter, a tantalum pentoxide ($Ta_2O_5$) based filter, and/or the like. In some implementations, second optical filter 230 may include multiple layers. For example, multiple layers may be deposited and/or patterned, such as by using a photolithography procedure and/or the like, to form second optical filter 230.

In some implementations, greater than a threshold percentage of light may pass through first optical filter 220 and second optical filter 230 at less than the threshold angle of incidence (or less than a threshold deviation from a configured angle of incidence). For example, first optical filter 220 and second optical filter 230 may permit, for light with an angle of incidence of less than approximately 60 degrees, less than approximately 45 degrees, less than approximately 30 degrees, and/or the like, greater than approximately 75% transmission, greater than approximately 90% transmission, greater than approximately 95% transmission, greater than approximately 99% transmission, or greater than approximately 99.9% transmission, transmission, among other examples.

In contrast, for light associated with greater than or equal to the threshold angle of incidence (e.g., rays 240-5 and 240-6, which deviate from a configured angle of incidence by a threshold amount), light may be blocked from passing through first optical filter 220 and/or second optical filter 230. In this case, light may be reflected by first optical filter 220 and/or second optical filter 230. In some implementations, less than or equal to a threshold percentage of light may be blocked by first optical filter 220 and second optical filter 230 at greater than or equal to the threshold angle of incidence. For example, first optical filter 220 and/or second optical filter 230 may be associated with, for light with an angle of incidence of greater than or equal to approximately 30 degrees, greater than or equal to approximately 45 degrees, greater than or equal to approximately 60 degrees, and/or the like, less than or equal to approximately 50% transmission, less than or equal to approximately 25% transmission, less than or equal to approximately 10% transmission, less than or equal to approximately 5% transmission, less than or equal to approximately 1% transmission, and/or the like. In this case, optical filter assembly 200 may block a threshold percentage of light, such as approximately 75%, approximately 90%, approximately 95%, approximately 99%, approximately 99.9%, approximately 99.99%, approximately 99.999%, and/or the like. In this way, use of a composite optical filter including a high angle shift component optical filter and a low angle shift component optical filter may obviate a need for an aperture, thereby enabling reduced manufacturing complexity, reduced cost, reduced package size, and/or the like for an optical device.

In some implementations, optical filter assembly 200 may be associated with a particular spectral range for which optical filter assembly 200 is to be transmissive at a first range of angles of incidence that satisfy an angle of incidence threshold and not transmissive at a second range of angles of incidence that do not satisfy the angle of incidence threshold. For example, optical filter assembly 200 may be associated with a spectral range of between approximately 600 nanometers (nm) and approximately 1200 nm, approximately 700 nm and approximately 1100 nm, approximately 800 nm and approximately 1000 nm, and/or the like. Additionally, or alternatively, optical filter assembly 200 may be associated with a spectral range of between approximately 1200 nm and approximately 2000 nm, approximately 1400 nm and approximately 1800 nm, approximately 1500 nm and approximately 1700 nm, and/or the like. Additionally, or alternatively, optical filter assembly 200 may be associated with a spectral range of between approximately 200 nm and approximately 4000 nm, approximately 1000 nm and approximately 3000 nm, approximately 1500 nm and approximately 2500 nm, and/or the like. In some implementations, the optical filter assembly 200 may be associated with a spectral range of between approximately 100 nm and approximately 14000 nm or a sub-range thereof. Additionally, or alternatively, optical filter assembly 200 may be associated with a visible spectral range, a near infrared spectral range, an ultraviolet spectral range, a combination thereof, and/or the like.

In some implementations, optical filter assembly 200 may include one or more other filters, such as a blocker, an edge filter, a bandpass filter, and/or the like. In some implementations, optical filter assembly 200 may include a protective covering (e.g., to protect first optical filter 220 and/or second optical filter 230 from environmental degradation). In some implementations, optical filter assembly 200 may include layers of one or more other materials. For example, optical filter assembly 200 may include, such as for first optical filter 220 or second optical filter 230, a silicon (Si) based material, a hydrogenated silicon (Si:H) based material, a germanium (Ge) based material, a hydrogenated germanium (Ge:H) based material, a silicon germanium (SiGe) based material, an aluminum (Al) based material, a silver (Ag) based material, a silicon dioxide ($SiO_2$) material, an aluminum oxide ($Al_2O_3$) material, a titanium dioxide ($TiO_2$) material, a niobium pentoxide ($Nb_2O_5$) material, a tantalum pentoxide ($Ta_2O_5$) material, a magnesium fluoride ($MgF_2$) material, a niobium titanium oxide (NbTiOx) material, a niobium tantalum pentoxide material ($NbTa_2O_5$), a zinc oxide material (ZnO), a platinum (Pt) material, a gold (Au) material, a fluorescent material, and/or the like. In some implementations, a spacer layer or material may be included in one or more optical filters.

As shown in FIG. 2B, optical filter assembly 200' may permit light with greater than or equal to the threshold angle of incidence to pass through, and may block or angle-shift light with less than the threshold angle of incidence from passing through. For example, optical filter assembly 200' may include a first optical filter 220' and a second optical filter 230' deposited onto a substrate 210'. First optical filter 220' may be a low angle shift filter and second optical filter 230' may be a high angle shift filter. In this case, first optical filter 220' and second optical filter 230' may be configured such that a wavelength of light directed to optical filter assembly 200' is transmissive to optical filter assembly 200' at high angles of incidence (e.g., greater than or equal to the threshold angle of incidence), and is reflected at low angles of incidence (e.g., less than the threshold angle of incidence).

In some implementations, the optical filter assemblies 200/200' may be bidirectional. For example, although the optical filter assemblies 200/200' are shown with light transmission in a particular direction, the optical filter assemblies 200/200' may be configured to allow light to pass through in another direction.

As indicated above, FIGS. 2A and 2B are provided merely as examples. Other examples are possible and may differ from what was described with regard to FIGS. 2A and 2B.

FIGS. 3A-3H are diagrams of optical characteristics of example optical filters.

Figure 3A:
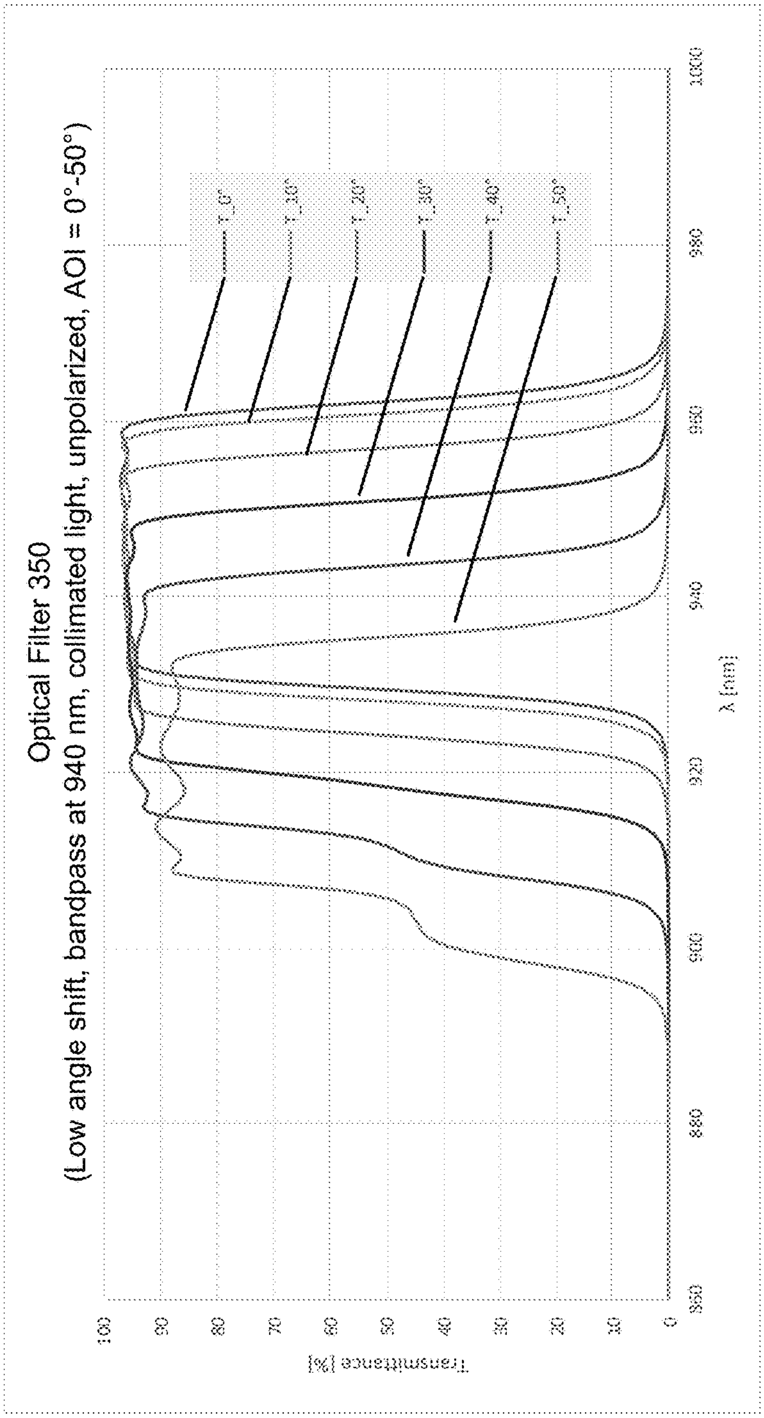
FIGS. 3A-3H are diagrams of optical characteristics of example optical filters.

As shown in FIG. 3A, a diagram 300 illustrates optical characteristics of a first optical filter 350, which may be a low angle shift filter with a bandpass at 940 nm. As shown in the diagram 300, the first optical filter 350 is subject to collimated light, which is unpolarized, and which is directed toward the first optical filter 350 with angles of incidence (AOIs) in a range of 0° to 50°. In this case, at the AOI of 0°, the first optical filter 350 exhibits a transmissivity of approximately 95% in a range of wavelengths from approximately 930 nm to approximately 960 nm (e.g., centered at approximately 940 nm). At an AOI of 30°, the first optical filter 350 exhibits a transmissivity of approximately 93% in a range of wavelengths from approximately 925 nm to approximately 950 nm. At an AOI of 50°, the first optical filter exhibits a transmissivity of approximately 90% in a range of wavelengths from approximately 915 nm to approximately 935 nm.

Figure 3B:
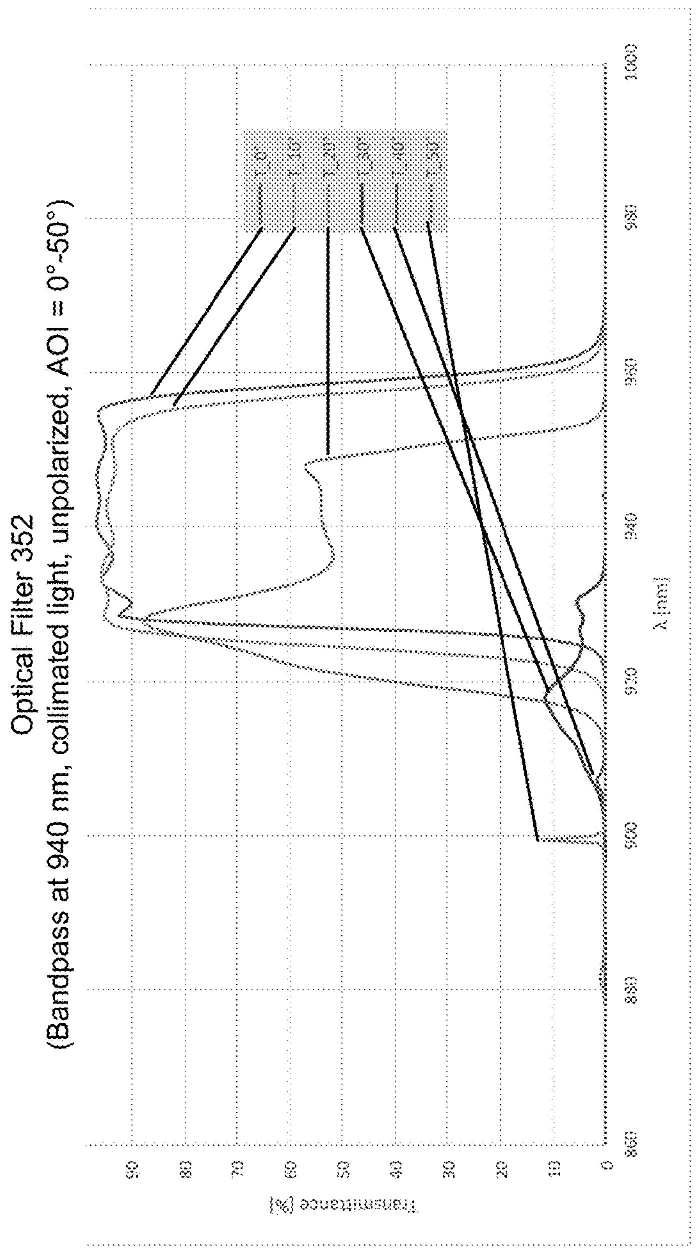

As shown in FIG. 3B, a diagram 302 illustrates optical characteristics of a second optical filter 352, which may be a composite optical filter including a bandpass filter and an angle shift filter with a bandpass at 940 nm. As shown in the diagram 302, the second optical filter 352 is subject to collimated light, which is unpolarized, and which is directed toward the second optical filter 352 with AOIs in a range of 0° to 50°. In this case, at the AOI of 0°, the second optical filter 352 has an approximately 95% transmissivity in a range of wavelengths from approximately 930 nm to approximately 955 nm (e.g., centered at 940 nm). At an AOI of 30°, the second optical filter 352 does not exceed a 50% transmissivity at any wavelength (and has a transmissivity above approximately 10% in a wavelength range of approximately 910 nm to approximately 945 nm). At an AOI of 50°, the second optical filter 352 does not exceed a transmissivity of 15% at any wavelength (and has a peak transmissivity of approximately 13% in a wavelength range of approximately 898 nm to approximately 900 nm). Accordingly, the second optical filter 352 has approximately the same bandpass as the optical filter 350 at low AOIs (e.g., a 0° AOI), but blocks most light at greater AOIs, rather than just shifting the bandpass as occurs with the first optical filter 350.

Figure 3C:
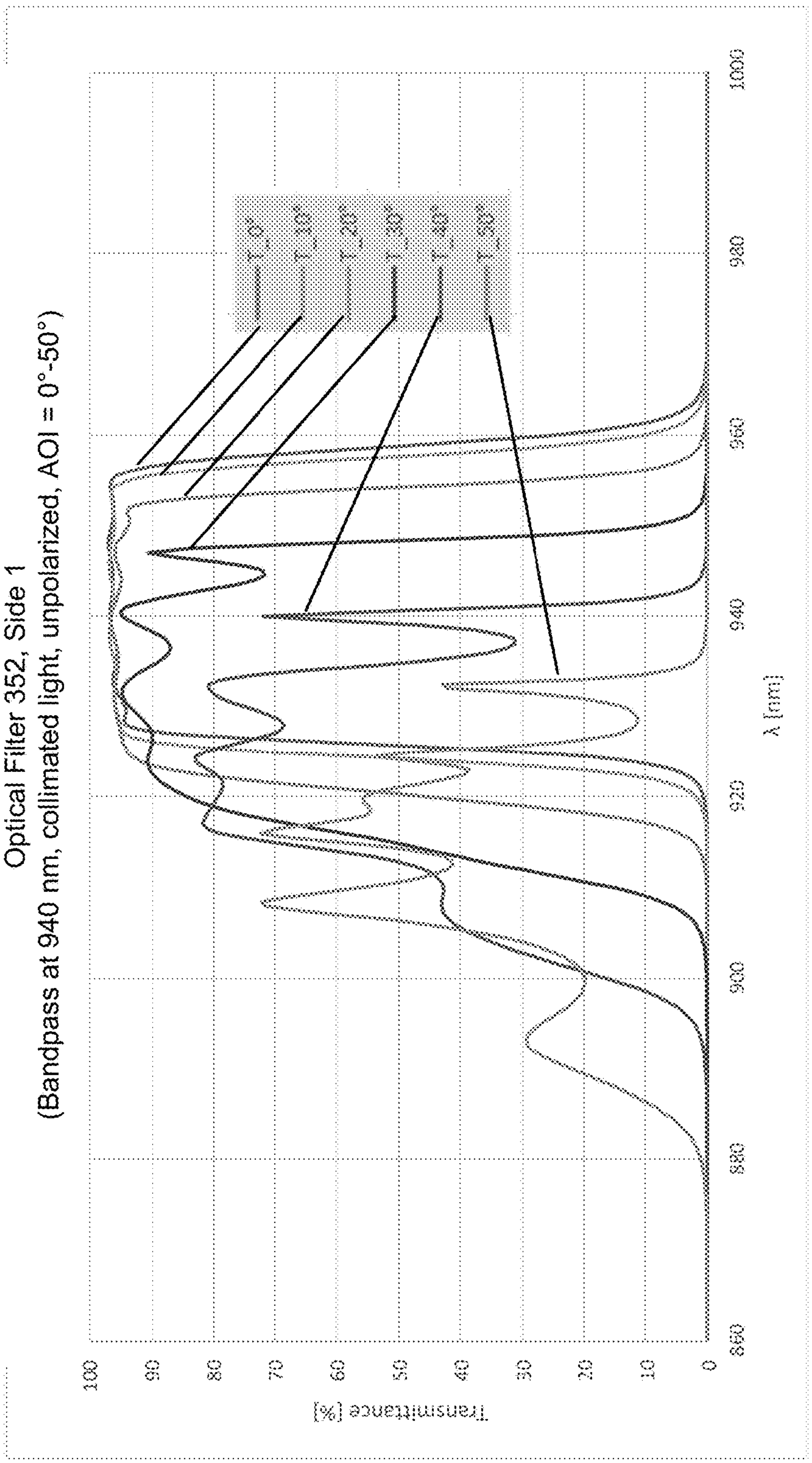
Figure 3D:
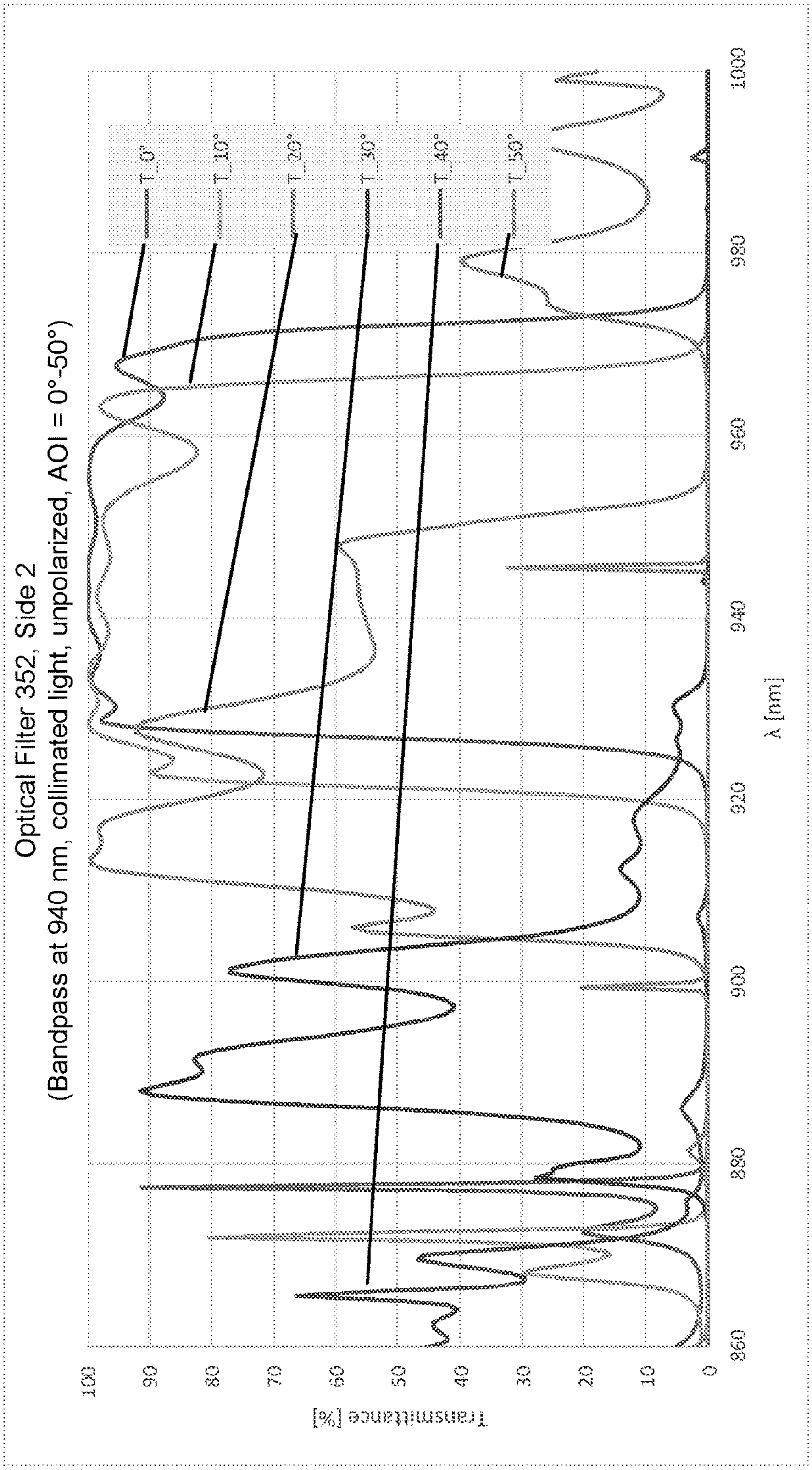

As shown in FIG. 3C, a diagram 304 illustrates optical characteristics of a first side of the second optical filter 352 (e.g., a first component optical filter, such as a bandpass filter). As shown in FIG. 3D, a diagram 306 illustrates optical characteristics of a second side of the second optical filter 352 (e.g., a second component optical filter, such as an angle shift filter, a high angle shift filter, or an angle-sensitive filter). As shown in diagrams 304 and 306, the second side of the second optical filter 352 provides greater angle sensitivity than is provided by the first side of optical filter 352.

Figure 3E:
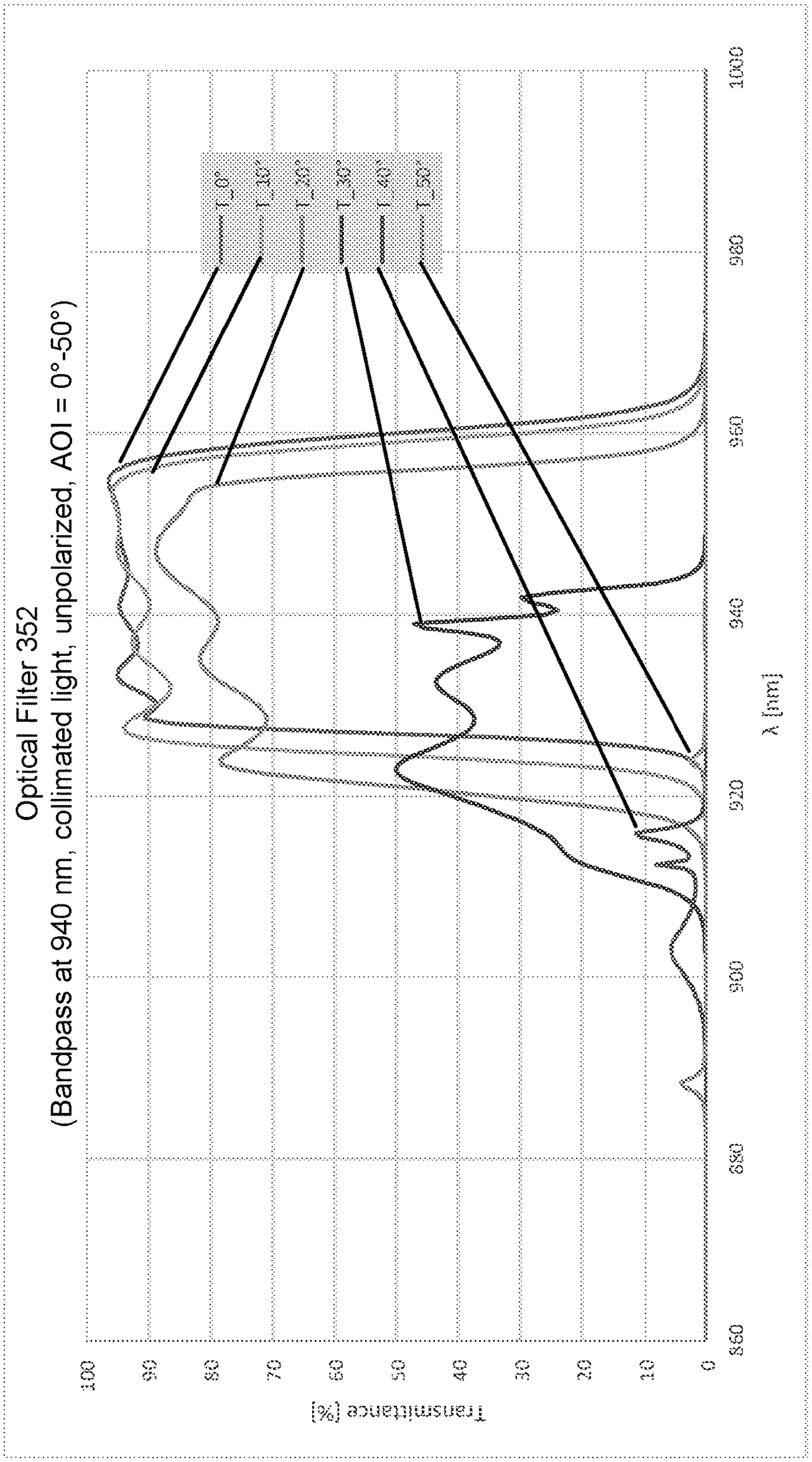

As shown in FIG. 3E, a diagram 308 illustrates optical characteristics of a third optical filter 354, which may be another composite optical filter including a bandpass filter and an angle shift filter with a bandpass at 940 nm. As shown in the diagram 308, the third optical filter 354 is subject to collimated light, which is unpolarized, and which is directed toward the third optical filter 354 with AOIs in a range of 0° to 50°. In this case, at the AOI of 0°, the third optical filter 354 has an approximately 90% transmissivity in a range of wavelengths from approximately 930 nm to approximately 955 nm (e.g., centered at 940 nm). At an AOI of 30°, the third optical filter 354 has an approximately 60%-70% range of transmissivities at a wavelength range of approximately 910 nm to approximately 950 nm). At an AOI of 50°, the third optical filter 354 does not exceed a transmissivity of 5% at any wavelength (and has a peak transmissivity of approximately 5% in a wavelength range of approximately 885 nm to approximately 890 nm). Accordingly, the third optical filter 354 has approximately the same bandpass as the optical filter 350 at low AOIs (e.g., a 0° AOI), but blocks most light at greater AOIs, rather than just shifting the bandpass as occurs with the first optical filter 350.

Figure 3F:
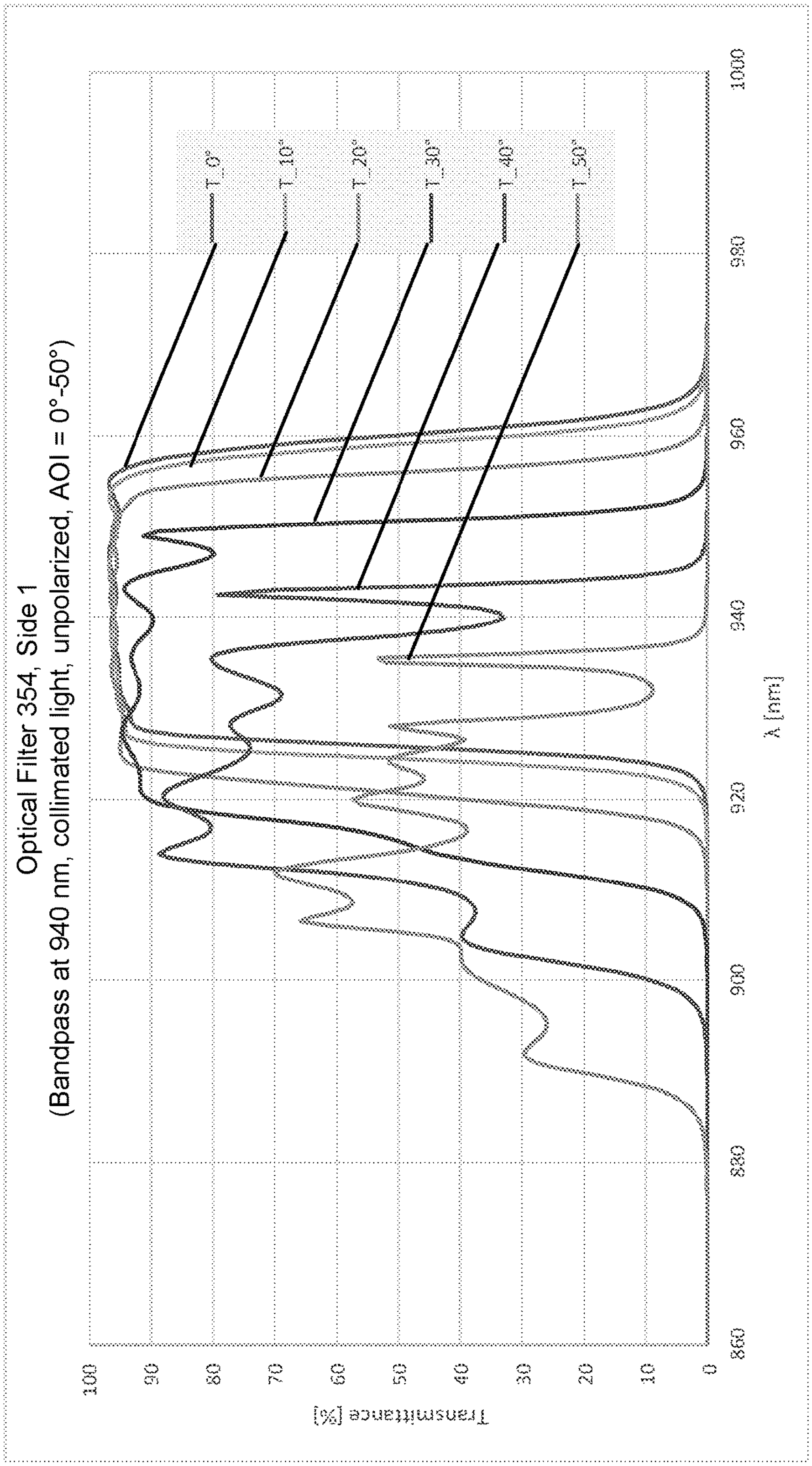
Figure 3G:
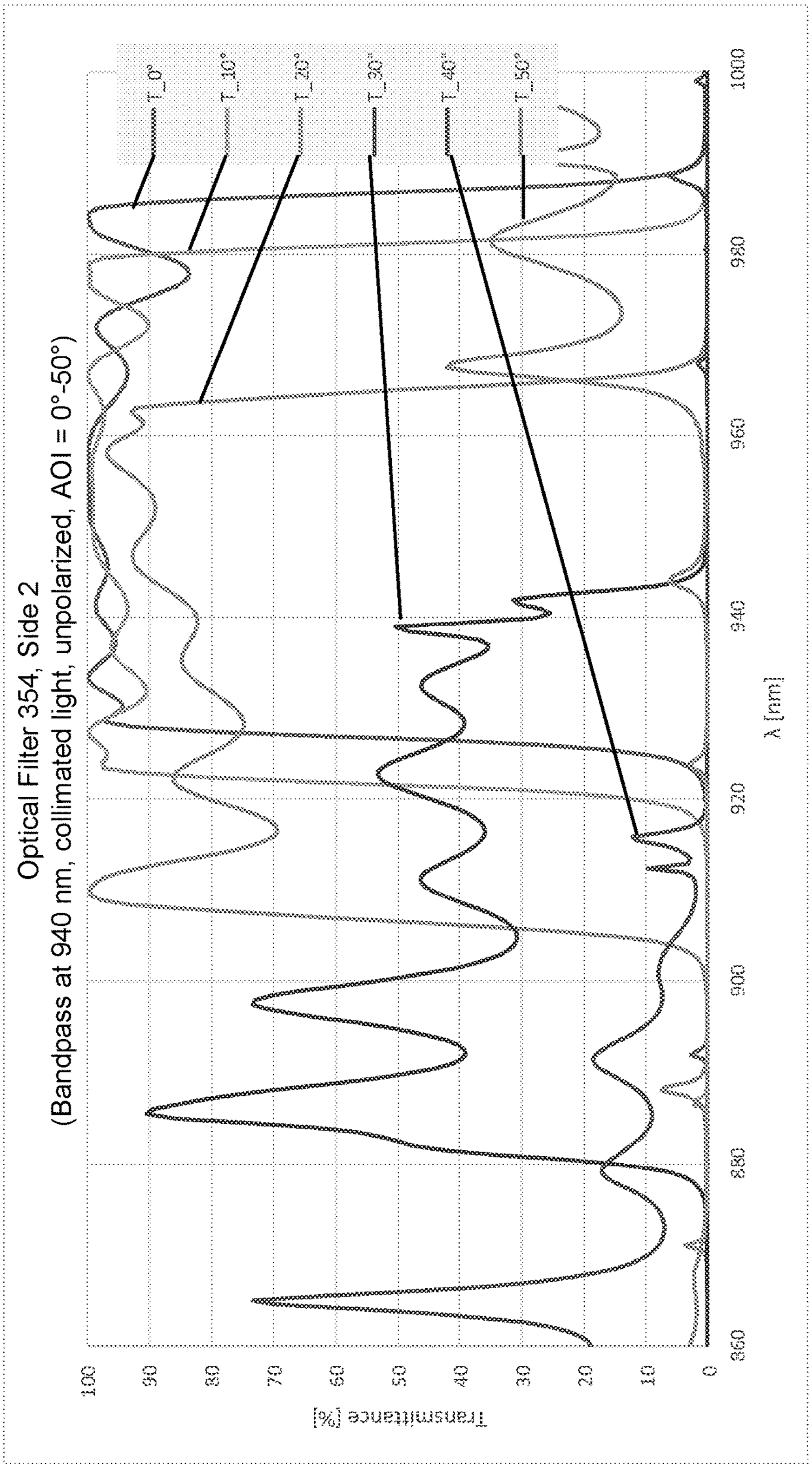

As shown in FIG. 3F, a diagram 310 illustrates optical characteristics of a first side of the third optical filter 354 (e.g., a first component optical filter, such as a bandpass filter). As shown in FIG. 3G, a diagram 312 illustrates optical characteristics of a second side of the third optical filter 354 (e.g., a second component optical filter, such as an angle shift filter, a high angle shift filter, or an angle-sensitive filter). As shown in diagrams 310 and 312, the second side of the second optical filter 354 provides greater angle sensitivity than is provided by the first side of optical filter 354.

Figure 3H:
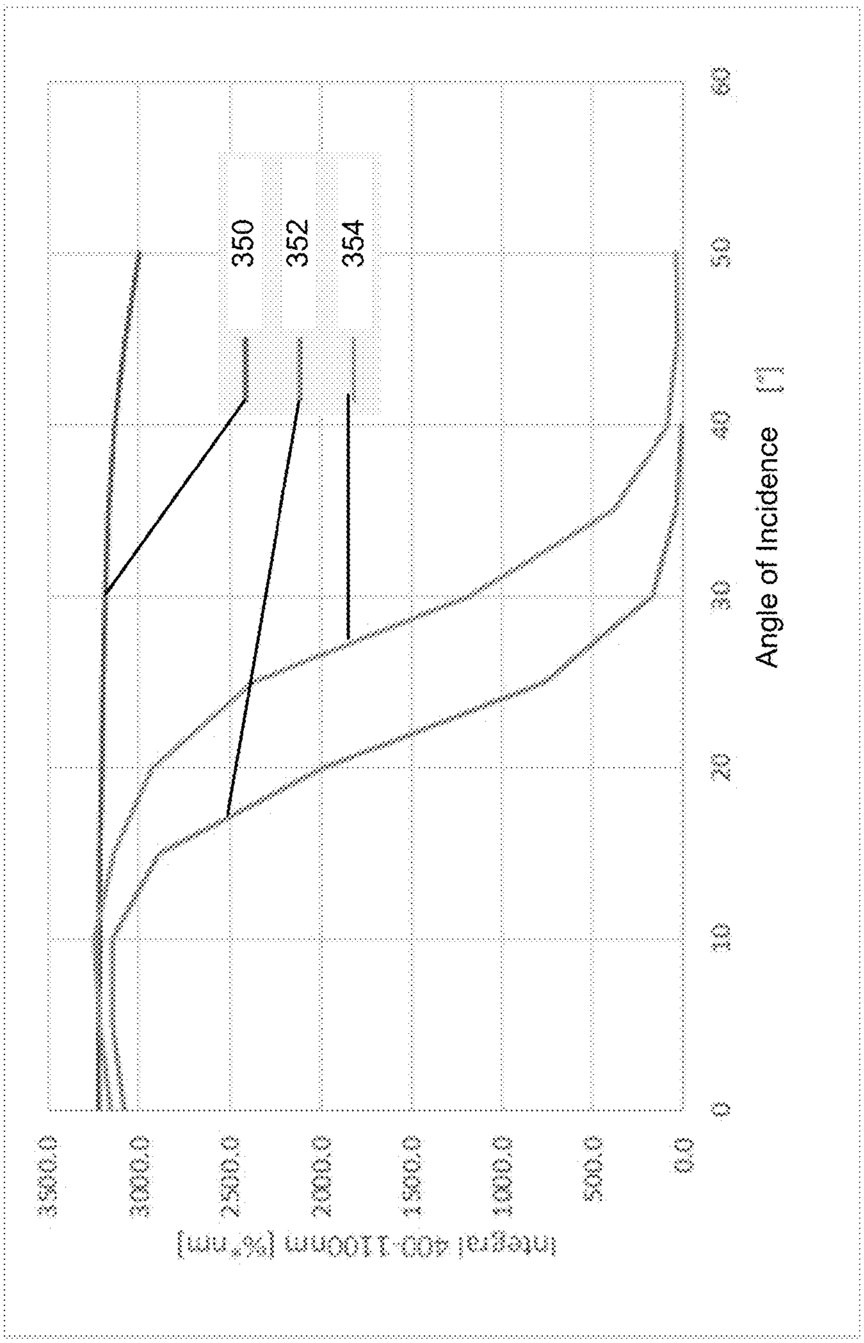

As shown in FIG. 3H shows a comparison of an integral of the transmissivity of optical filters 350-354 at angles of incidence from 0° to 50°. As shown, the first optical filter 350, which does not include an angle shift filter, provides a high level of transmissivity across AOIs. In contrast, the second optical filter 352 and the third optical filter 354 provide a drop off in transmissivity at higher AOIs (e.g., AOIs greater than 10°), thereby exhibiting angle-sensitivity. In FIG. 3H, the optical filters 352 and 354 transmit a greater than a first threshold amount of light in a first configured angle range and less than a second threshold amount of light in a second configured angle range. For example, the optical filters 352 and/or 354 transmit greater than a threshold percentage (e.g., 50%, 75%, 90%, 95%, or 99%) of light through at angles of incidence in a range of 0° to 10°, 0° to 20°, or 0° to 30°, among other examples. In contrast, the optical filter 352 transmits less than a threshold percentage (e.g., 50%, 25%, 10%, 5%, or 1%) of light through at angles of incidence in a range of 30° to 90°, 40° to 90°, or 50° to 90 degrees, among other examples.

As indicated above, FIGS. 3A-3H are provided merely as examples. Other examples are possible and may differ from what was described with regard to FIGS. 3A-3H.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical filter assembly, comprising:
- a first optical filter disposed on a first side of a substrate, wherein the first optical filter is a bandpass filter; and
- a second optical filter disposed on a second side of the substrate,
  - wherein the second optical filter is a high angle shift filter associated with a threshold amount of angle shift at a threshold angle of incidence,
    - wherein the second optical filter is associated with angle shifts of greater than 10%.

2. The optical filter assembly of claim 1, wherein the second optical filter includes an anti-reflectance filter for a bandpass region of the bandpass filter.

3. The optical filter assembly of claim 1, wherein the second optical filter includes a long wavelength passband filter.

4. The optical filter assembly of claim 1, wherein the second optical filter includes a short wavelength passband filter.

5. The optical filter assembly of claim 1, wherein the second optical filter includes a broad passband filter.

6. The optical filter assembly of claim 1, wherein the first optical filter is a low angle-shift (LAS) bandpass filter.

7. The optical filter assembly of claim 1, wherein the first optical filter is a hyper-low angle shift (HLAS) bandpass filter.

8. An optical filter, comprising:
- a bandpass filter with at least a first threshold level of transmissivity at a configured center wavelength,
  - wherein a first side of the bandpass filter is configured to receive a beam; and
- a high angle shift filter with at least a second threshold level of angle shift at the configured center wavelength and at angles of incidence greater than a configured value,
  - wherein the high angle shift filter is disposed on a second side of the bandpass filter, and
  - wherein the high angle shift filter is associated with angle shifts of greater than 10%.

9. The optical filter of claim 8, wherein the bandpass filter includes an alternating arrangement of one or more high refractive index layers and one or more low refractive index layers.

10. The optical filter of claim 9, wherein the one or more high refractive index layers include at least one of:
- an amorphous silicon layer, or
- a hydrogenated silicon layer.

11. The optical filter of claim 9, wherein the one or more low refractive index layers include at least one of:
- a silicon oxide layer,
- a titanium oxide layer,
- a tantalum oxide layer.

12. The optical filter of claim 8, wherein the high angle shift filter includes at least one of:
- a tantalum oxide layer,
- a titanium oxide layer,
- a niobium oxide layer,
- a germanium oxide layer, or
- a silicon oxide layer.

13. The optical filter of claim 8, wherein the configured center wavelength is in a range of 100 nanometers (nm) to 14000 nm.

14. The optical filter of claim 8, wherein the configured value is in a range of 30 degrees to 90 degrees.

15. An optical system, comprising:
- an electro-optic component; and
- a composite optical filter, the composite optical filter including:
  - a bandpass filter with at least a first threshold level of transmissivity at a configured center wavelength,
    - wherein a first side of the bandpass filter is configured to receive a beam; and
  - a high angle shift filter with at least a second threshold level of angle shift at the configured center wavelength and at angles of incidence greater than a configured value,
    - wherein the high angle shift filter is disposed on a second side of the bandpass filter opposite to the first side of the bandpass filter,
    - wherein the composite optical filter is aligned to the electro-optic component, and
    - wherein the composite optical filter is configured to transmit a greater than a first threshold amount of light in a first configured angle range and less than a second threshold amount of light in a second configured angle range.

16. The optical system of claim 15, wherein the electro-optic component is an optical emitter configured to emit at the configured center wavelength.

17. The optical system of claim 15, wherein the electro-optic component is an optical detector configured to detect at the configured center wavelength.

18. The optical system of claim 15, wherein the bandpass filter includes an alternating arrangement of one or more high refractive index layers and one or more low refractive index layers.

19. The optical system of claim 15, wherein the bandpass filter includes a substrate, and wherein the high angle shift filter is disposed on the substrate.

20. The optical system of claim 19, wherein the substrate is a glass substrate.

* * * * *